(12) United States Patent
Burgin et al.

(10) Patent No.: US 10,140,739 B1
(45) Date of Patent: Nov. 27, 2018

(54) USER INTERFACE FOR AUTOMATICALLY GENERATING CHARTS

(71) Applicant: Palantir Technologies Inc., Palo Alto, CA (US)

(72) Inventors: Walker Burgin, Seattle, WA (US); Benjamin Hamme, San Francisco, CA (US); Caitlin Colgrove, Palo Alto, CA (US); Dzmitry Dulko, San Jose, CA (US); Xiaohan Zhang, Sunnyvale, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/799,829

(22) Filed: Oct. 31, 2017

Related U.S. Application Data (60) Provisional application No. 62/427,316, filed on Nov. 29, 2016.

(51) Int. Cl.
  *G06T 11/20* (2006.01)
  *G06F 3/0486* (2013.01)
  *G06F 3/0482* (2013.01)

(52) U.S. Cl.
  CPC .......... *G06T 11/206* (2013.01); *G06F 3/0486* (2013.01); *G06F 3/0482* (2013.01); *G06T 2200/24* (2013.01)

(58) Field of Classification Search
  CPC .................................................. G06T 11/206
  USPC ....................................................... 345/440
  See application file for complete search history.

(56) References Cited

U.S. PATENT DOCUMENTS

| | | | |
|---|---|---|---|
| 6,904,588 B2 | 6/2005 | Reddy et al. | |
| 7,262,773 B2 * | 8/2007 | Couckuyt | G06F 3/0486 345/440 |
| 7,800,613 B2 * | 9/2010 | Hanrahan | G06T 11/206 345/440 |
| 7,836,028 B1 | 11/2010 | Agarwal et al. | |
| 8,108,790 B2 | 1/2012 | Morrison, Jr. et al. | |
| 8,487,934 B2 * | 7/2013 | Sakurai | G06T 11/203 345/440 |

(Continued)

OTHER PUBLICATIONS

Chen et al., "iVIBRATE: Interactive Visualization-Based Framework for Clustering Large Datasets," ACM Transaction on Information Systems, vol. 24, No. 2, Apr. 2006, pp. 245-294.

(Continued)

*Primary Examiner* — Ryan R Yang
(74) *Attorney, Agent, or Firm* — Sheppard Mullin Richter & Hampton LLP (57) ABSTRACT

Systems and methods are provided for providing an interface that includes a first region for displaying one or more charts that are generated from at least one data set and a second region through which at least some of the data set is accessible. A determination is made that at least one first subset of the data set is selected from the second region to be plotted along a first axis. A determination is made that at least one second subset of the data set is selected from the second region to be plotted along a second axis. A chart is displayed in the first region of the interface, the chart being generated based at least in part on the first subset of the data to be plotted along the first axis and the second subset of the data to be plotted along the second axis.

17 Claims, 7 Drawing Sheets

(56) References Cited

U.S. PATENT DOCUMENTS

| | | | |
|---|---|---|---|
| 2004/0164983 A1* | 8/2004 | Khozai | G06T 11/206 345/440 |
| 2006/0005163 A1 | 1/2006 | Huesken et al. | |
| 2006/0238538 A1* | 10/2006 | Kapler | G06Q 10/06 345/440 |
| 2007/0124373 A1 | 5/2007 | Chatterjee et al. | |
| 2007/0208992 A1* | 9/2007 | Koren | G06Q 10/10 715/212 |
| 2008/0189678 A1 | 8/2008 | Joo et al. | |
| 2008/0278495 A1* | 11/2008 | Minamide | G06T 11/206 345/440 |
| 2009/0019426 A1 | 1/2009 | Baueumer et al. | |
| 2012/0019559 A1* | 1/2012 | Siler | G06T 11/206 345/634 |
| 2012/0272186 A1* | 10/2012 | Kraut | G06F 3/0488 715/810 |
| 2014/0232724 A1* | 8/2014 | Jain | G06T 11/206 345/440 |
| 2017/0206684 A1 | 7/2017 | Duncker | |

OTHER PUBLICATIONS

Correa et al., "SPVN: A New Application Framework for Interactive Visualization of Large Datasets," SIGGRAPH 2007, San Diego, California, Aug. 5-9, 2007, No. 12, 6 pages.

Eick, Stephen G., "Visual Discovery and Analysis," IEEE Transactions on Visualization and Computer Graphics, vol. 6, No. 1, Jan.-Mar. 2000, pp. 44-58.

Jomier et al., "Remote Visualization of Large Datesets with MIDAS and ParaViewWeb," Web3D '11, Paris, France, Jun. 20-22, 2011, pp. 147-150.

* cited by examiner

USER INTERFACE FOR AUTOMATICALLY GENERATING CHARTS

CROSS REFERENCE TO RELATED APPLICATIONS

This application claims the benefit under 35 U.S.C. § 119(e) of the U.S. Provisional Application Serial No. 62/427,316, filed Nov. 29, 2016, the content of which is hereby incorporated by reference in its entirety.

FIELD OF THE INVENTION

This disclosure relates to approaches for analyzing data.

BACKGROUND

Analyzing high-volume data sources can be a time and resource intensive process. Users, such as data analysts, often face a seemingly insurmountable task of individually evaluating discrete pieces of information from various data sources. Often, many iterations to explore such data are required, with each iteration typically requiring additional time and resources.

SUMMARY

Various embodiments of the present disclosure can include systems, methods, and non-transitory computer readable media configured to providing an interface that includes a first region for displaying one or more charts that are generated from at least one data set and a second region through which at least some of the data set is accessible. A determination is made that at least one first subset of the data set is selected from the second region to be plotted along a first axis. A determination is made that at least one second subset of the data set is selected from the second region to be plotted along a second axis. A chart is displayed in the first region of the interface, the chart being generated based at least in part on the first subset of the data to be plotted along the first axis and the second subset of the data to be plotted along the second axis.

In some embodiments, the systems, methods, and non-transitory computer readable media are configured to determine that a user operating the system has performed an operation to drag-and-drop a representation of the first subset from the second region into the first region.

In some embodiments, the first region includes a first field that corresponds to the first axis, and wherein the first region includes a second field that corresponds to the second axis.

In some embodiments, the systems, methods, and non-transitory computer readable media are configured to determine that a user operating the system has inputted a name of a column included in the data set into a field in the first region that corresponds to the first axis.

In some embodiments, the systems, methods, and non-transitory computer readable media are configured to determine that a user operating the system has performed an operation to apply at least one aggregate transformation to the first subset of the data, the chart in the first region being generated based at least in part on the applied aggregate transformation to the first subset of the data.

In some embodiments, the data set is presented in the second region of the interface in a tabular format, wherein the first subset corresponds to a first column, and wherein the second subset corresponds to a second column.

In some embodiments, the systems, methods, and non-transitory computer readable media are configured to determine that at least one third subset of the data set is selected from the second region to be plotted along the second axis and display an updated chart in the first region of the interface, the chart being generated based at least in part on the first subset of the data to be plotted along the first axis, the second subset of the data to be plotted along the second axis, and the third subset of the data to be plotted along the second axis.

In some embodiments, the systems, methods, and non-transitory computer readable media are configured to export the generated chart as an artifact, the artifact being embedded in at least one report.

In some embodiments, the embedded artifact is capable of being automatically updated in the report to reflect changes made to the data set.

In some embodiments, the embedded artifact is capable of being shared with other users over one or more communication mediums.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Under conventional approaches, users tasked with evaluating various data sets will typically need a background in data analysis. For example, a data set being analyzed may initially need to be extracted and/or organized, which may require writing and submitting queries. The data set may also need to be cleaned, for example, to remove duplicates or errors. Once processed, the data may be analyzed (or visualized) using various data analysis and modeling techniques. As a result, the data analysis process can be cumbersome for users that are not technically inclined. Such limitations restrict the ability of non-technical users to effectively analyze and visualize data.

A claimed solution rooted in computer technology overcomes problems specifically arising in the realm of computer technology. In various implementations, users can access various user interfaces for analyzing and visualizing data. In one example, such user interfaces can provide data visualization tools for automatically generating charts from various data sets. In some embodiments, these data visualization tools provide myriad features that allow non-technical users to easily generate visualizations of selected data sets. For example, in some embodiments, a user interacting with such interfaces can specify a data set, select portions of the data set to be visualized, and select a chart type for visualizing the selected portions. In this example, a data analysis system can generate a chart based on the user's selections. The generated chart can then be presented to the user in the same interface. In some embodiments, generated charts can be stored as sharable artifacts. These artifacts can continue to be updated in real-time as the underlying data set changes. In some embodiments, the charts are collaboratively editable by multiple users through separate user interfaces.

In some embodiments, the user interface can include a first region in which one or more charts to be generated are displayed and a second region through which a selected data set is accessible and searchable. A user accessing the interface can simply drag and drop subsets (or columns) of the data set to be plotted along some axis from the second region into the first region. In response, a chart can automatically be generated based on the selected subsets. The chart can then be presented in the first region of the user interface. For example, a user can designate a column corresponding to a country name to be plotted along the x-axis and a column corresponding to the number of medals won by members of that country along the y-axis. In response, a chart plotting the total medal count by country can be generated and displayed. The user can add other dimensions to the generated chart such as plotting the total medal count by country and by gender, for example. In some embodiments, the user can also select a type of chart to be generated (e.g., area plot, bar plot, heat grid, line chart, pie chart, scatter plot, etc.).

FIGS. 1-4 illustrate example user interfaces for analyzing data, in accordance with various embodiments. In some embodiments, these interfaces may be accessed as part of a workflow for visualizing data sets. In various embodiments, these user interfaces may be accessed through a software application running on a computing device (e.g., computers, mobile phones, tablets, etc.) that includes one or more processors and memory. For example, the user interfaces may be accessible through a web browser. In another example, the user interfaces may be provided through a data analysis application. In yet another example, the user interfaces may be provided as a service over a network (e.g., software as a service). Depending on the computing device, the user may be able to interact with the interfaces using various input devices (e.g., keyboard, mouse, etc.) and/or touch gestures. These user interfaces are provided merely as examples and, naturally, the arrangement and configuration of such interfaces can vary depending on the implementation. Thus, depending on the implementation, the user interfaces may include additional features or alternative features.

Figure 1:
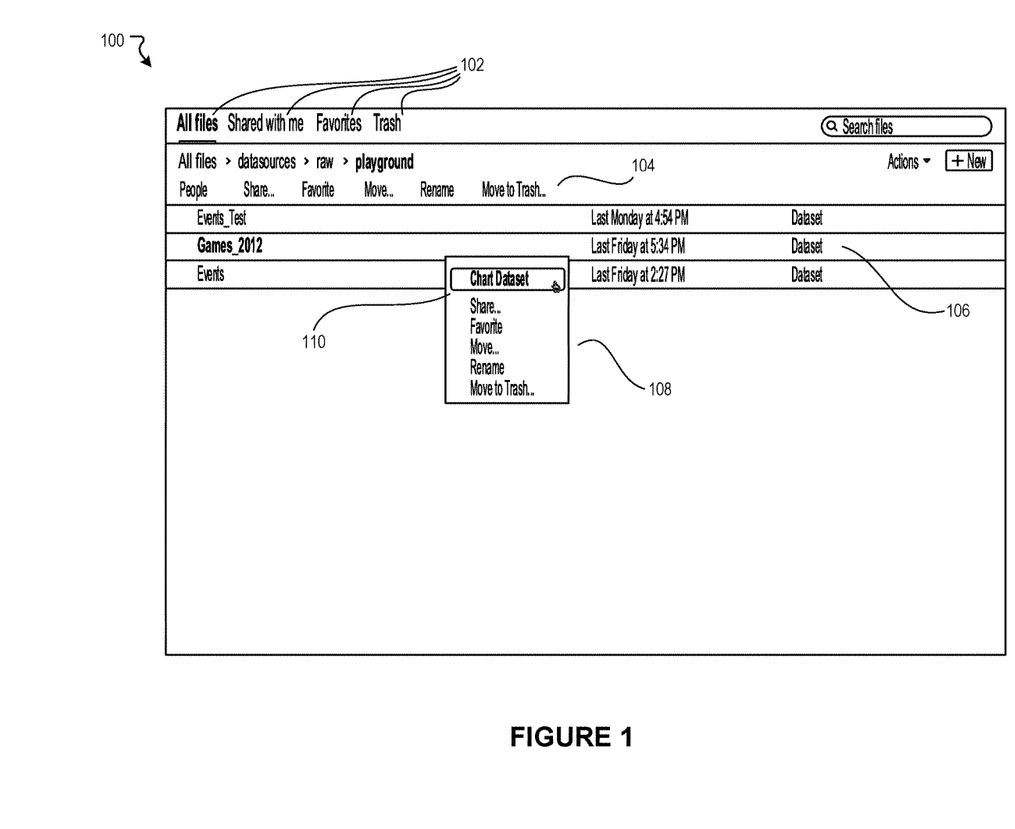
FIG. 1 illustrates an example interface for analyzing data, in accordance with various embodiments.

FIG. 1 illustrates an example interface 100 for selecting data to be visualized. In some embodiments, the interface 100 may be presented through a display screen of a computing device. Further, the interface 100 may be provided through an application (e.g., web browser, data analysis application, etc.) running on the computing device. In some embodiments, a data analysis platform can be configured to utilize various generally known data processing engines and/or techniques to enable the functionality described in reference to the interface 100. The computing device through which the interface 100 is being accessed can interact with the data analysis platform to enable such functionality.

As shown, the interface 100 includes options 102 for accessing data, e.g., data sets, from various data sources (or data stores). In general, such data sets may be stored as tables in one or more data stores, comma separated values (CSV) files, electronic spreadsheet documents, structured data objects (e.g., JSON, XML, etc.), to name some examples. A data set can refer to any organized set of data. For example, a data set can refer to the contents of a database table that includes one or more columns and one or more rows. A user operating the computing device can interact with the interface 100 to select data sets that are accessible to the user. The user can also select various options 104 to perform operations on the selected data sets including, for example, sharing data sets with other users of the data analysis platform, moving data sets to different data sources, renaming data sets, or deleting data sets, to name some examples.

In the example of FIG. 1, the user operating the computing device has selected a data set 106. Once selected, the user can access additional options 108 (e.g., by a right-click, touch gesture, etc.) that are capable of being performed using the selected data set 106. In some embodiments, an option 110 for charting the data set can be selected to generate one or more charts for visualizing the data. In some embodiments, when the option 110 is selected, the interface 100 is updated and/or transitioned to another interface through which the data set can be visualized, as illustrated in the example of FIG. 2.

Figure 2:
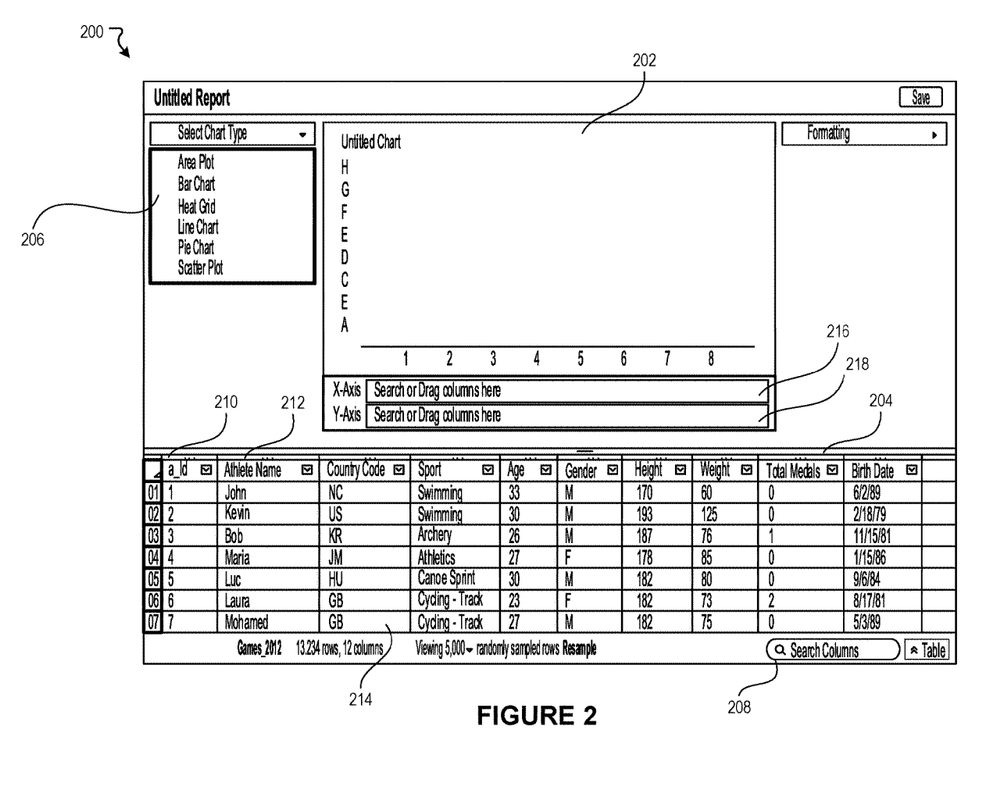
FIG. 2 illustrates another example interface for analyzing data, in accordance with various embodiments.

FIG. 2 illustrates an example interface 200 for visualizing data sets. In some embodiments, the interface 200 may be presented through a display screen of a computing device. Further, the interface 200 may be provided through an application (e.g., web browser, data analysis application, etc.) running on the computing device. In some embodiments, a data analysis platform can be configured to utilize various data processing engines to enable the functionality described in reference to the interface 200. The computing device through which the interface 200 is being accessed can interact with the data analysis platform to enable such functionality.

In the example of FIG. 2, the interface 200 provides a number of options for automatically generating and customizing charts. In some embodiments, the interface 200 includes a first region 202 in which one or more charts to be generated are displayed and a second region 204 through which a selected data set is accessible and searchable. The interface 200 also includes a region 206 (e.g., drop-down menu) through which the user accessing the interface 200 can select a type of chart to be generated based on the selected data set. In some embodiments, the region 206 includes options for generating an area plot, a bar chart, a heat grid, a line chart, a pie chart, or scatter plot, to name some examples.

Figure 3:
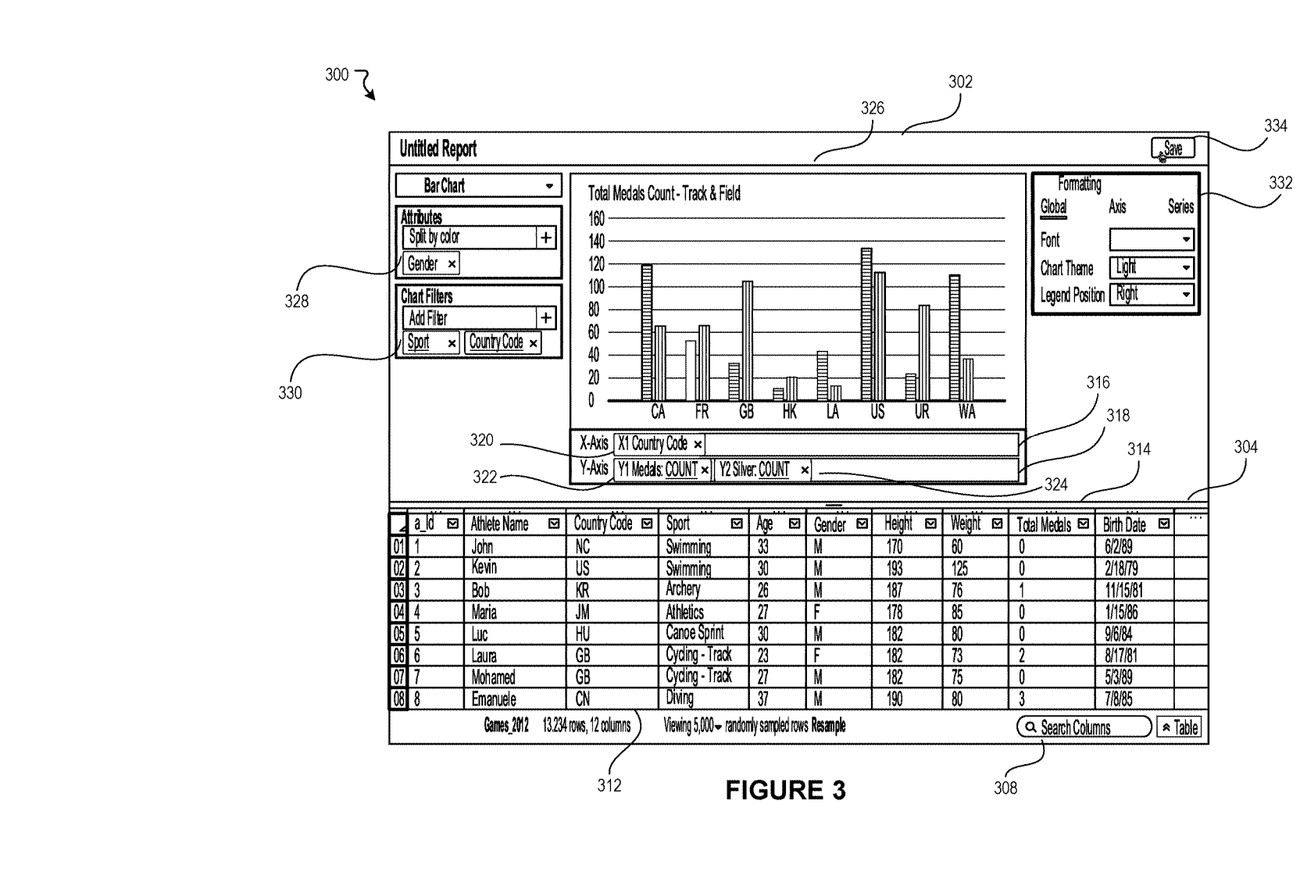
FIG. 3 illustrates another example interface for analyzing data, in accordance with various embodiments.

In some embodiments, the data set shown in the region 204 is presented in a tabular format. In one example, the data set may correspond to a table in a database. As shown, the selected data set, or a portion of the selected data set, can be presented in the region 204. In some embodiments, the region 204 provides functionality for interacting with the selected data set. For example, the user can search for columns (or entries) in the data set by entering search terms in a search field 208. In this example, the region 204 can present an updated version of the data set that includes columns (or entries) that are responsive to the search terms. In another example, the user can sort values in any of the columns (e.g., column 210, column 212, column 214, etc.) in the data set. The user can select any of these columns to be plotted in a chart. For example, in some embodiments, the user can drag and drop columns (or subsets) of the data set to be plotted along some axis from the region 204 into the first region 202. In this example, any column to be plotted along some axis can be placed into a field corresponding to the axis. As shown in the example of FIG. 2, the region 202 includes a first field 216 corresponding to the X-axis and a second field 218 corresponding to the Y-axis. Once the columns have been selected, the region 202 of the interface 200 can be updated to present a chart. This chart can be generated based on the columns selected from the data set and the corresponding axes to which the columns were assigned, as illustrated in the example of FIG. 3. In some embodiments, rather than placing the columns, the user also has the option to input the names of the columns to be plotted directly into the first field 216 and/or the second field 218. In such embodiments, the region 202 of the interface 202 can be updated to present a chart that was generated based on the corresponding axes for which the column names were provided.

FIG. 3 illustrates an example interface 300 for visualizing data sets. In some embodiments, the interface 300 may be presented through a display screen of a computing device. Further, the interface 300 may be provided through an application (e.g., web browser, data analysis application, etc.) running on the computing device. In some embodiments, a data analysis platform can be configured to utilize various data processing engines to enable the functionality described in reference to the interface 300. The computing device through which the interface 300 is being accessed can interact with the data analysis platform to enable such functionality.

As shown, the interface 300 includes a first region 302 in which one or more charts to be generated are displayed and a second region 304 through which a selected data set is accessible and searchable. Here, the data set presented in the region 304 includes a column corresponding to an athlete's identifier, a column corresponding to the athlete's name, a column 312 corresponding to a country code that references the athlete's representative country, a column corresponding to the athlete's sport, a column corresponding to the athlete's age, a column corresponding to the athlete's gender, a column corresponding to the athlete's height, a column corresponding to the athlete's weight, a column 314 corresponding to a total number of medals earned by the athlete, a column corresponding to the athlete's birthday, among others that can be revealed, for example, by scrolling or panning the data set presented in the region 304 or by searching for the column through the search field 308.

In the example of FIG. 3, the user interacting with the interface 300 has selected the column 312 that corresponds to the country code to be plotted along the X-axis. As a result, the field 316 corresponding to the X-axis is shown with an identifier 320 that references the selected column 312. Similarly, the user has selected the column 314 corresponding to total medals to be plotted along the Y-axis. In response, the field 318 corresponding to the Y-axis is shown with an identifier 322 that references the selected column 314. In some embodiments, multiple columns can be selected to be plotted along a given axis. For example, in FIG. 3, a column "silver" that corresponds to a total number of silver medals won by an athlete has been selected to be plotted along the Y-axis. Thus, the field 318 corresponding to the Y-axis is shown with another identifier 324 that references the selected "silver" column.

In some embodiments, the user can select various aggregate transformations to be applied to columns in the data set. For example, in FIG. 3, the user has selected a "count" transformation to be applied to values in the column 314. As a result, the identifier 322 that references the column 314 indicates the applied aggregate transformation ("COUNT"). Similarly, the user has selected the count transformation to be applied to values in the "silver" column. Consequently, the identifier 324 that references the "silver" column also indicates the applied aggregate transformation ("COUNT"). In some embodiments, the count transformation returns the number of items in a group. In various embodiments, other types of aggregate transformations can be applied to the data set including, for example, a "group by" transformation that divides the data set into groups, a "sum" transformation that sums the values in a column, an "average" transformation that returns the average of the values in a column, a "count distinct" transformation that returns the number of unique non-null values in a group, a "minimum" transformation that returns the minimum value in a group (e.g., column), and a "maximum" transformation that returns the maximum value in a group (e.g., column), to name some examples.

In various embodiments, a chart 326 can be generated based on the mapping of columns to the X- and Y-axis, as indicated by the identifiers 320, 322, and 324. For example, the computing device can provide information describing this mapping to the data analysis platform for purposes of generating the chart 326. In some embodiments, the computing device also provides the data analysis platform with the data (e.g., values) corresponding to the selected columns for purposes of generating the chart 326. In some embodiments, the data corresponding to the selected data set is stored in one or more other data sources that are accessible to the data analysis platform. Once the chart 326 is generated, the data analysis platform can provide information describing the generated chart 326 to the computing device, for example, over a network (e.g., the Internet). The computing device can use this information to render and present the chart 326 in the region 302 of the interface 300.

In some embodiments, the chart 326 can be updated in real-time. For example, the user interacting with the interface 300 can add new columns to the field 316 corresponding to the X-axis and/or the field 318 corresponding to the Y-axis. In response, the chart 326 can be updated in the region 302 based on the new mapping of columns to axes. Similarly, the user can remove existing columns from the field 316 and/or the field 318 to update the chart 326 accordingly. When removing a column (e.g., the "country code" column in field 316), the user can simply select an option to delete the identifier (e.g., the identifier 320) that corresponds the column.

The interface 300 also provides options for customizing the chart 326. For example, in some embodiments, the user can define attributes 328 (e.g., columns) to be split by color (or some other distinguishing feature). The user can also define one or more filters 330 (e.g., columns) for filtering the chart. The chart 326 can also be customized using a set of formatting options 332 from which the user can select a font to be used for text in the chart 326, a theme to be applied to the chart 326, and positioning details (e.g., position of chart legend) for various content (or text) in the chart 326.

In some embodiments, charts are collaboratively editable by multiple users through separate user interfaces. For example, a first user accessing the interface 300 can interact with the interface 300 to edit the chart 326 (e.g., add or remove columns to be plotted). Similarly, a second user accessing the chart 326 through a different interface can interact with the interface to also edit the chart 326 without interfering with (or clobbering) the edits made by the first user. In various embodiments, such collaboration may be enabled in a networked environment in which the computing devices of the first user and the second user communicate with the data analysis platform. The data analysis platform can utilize generally known operational transformation techniques to enable such collaboration.

Figure 4:
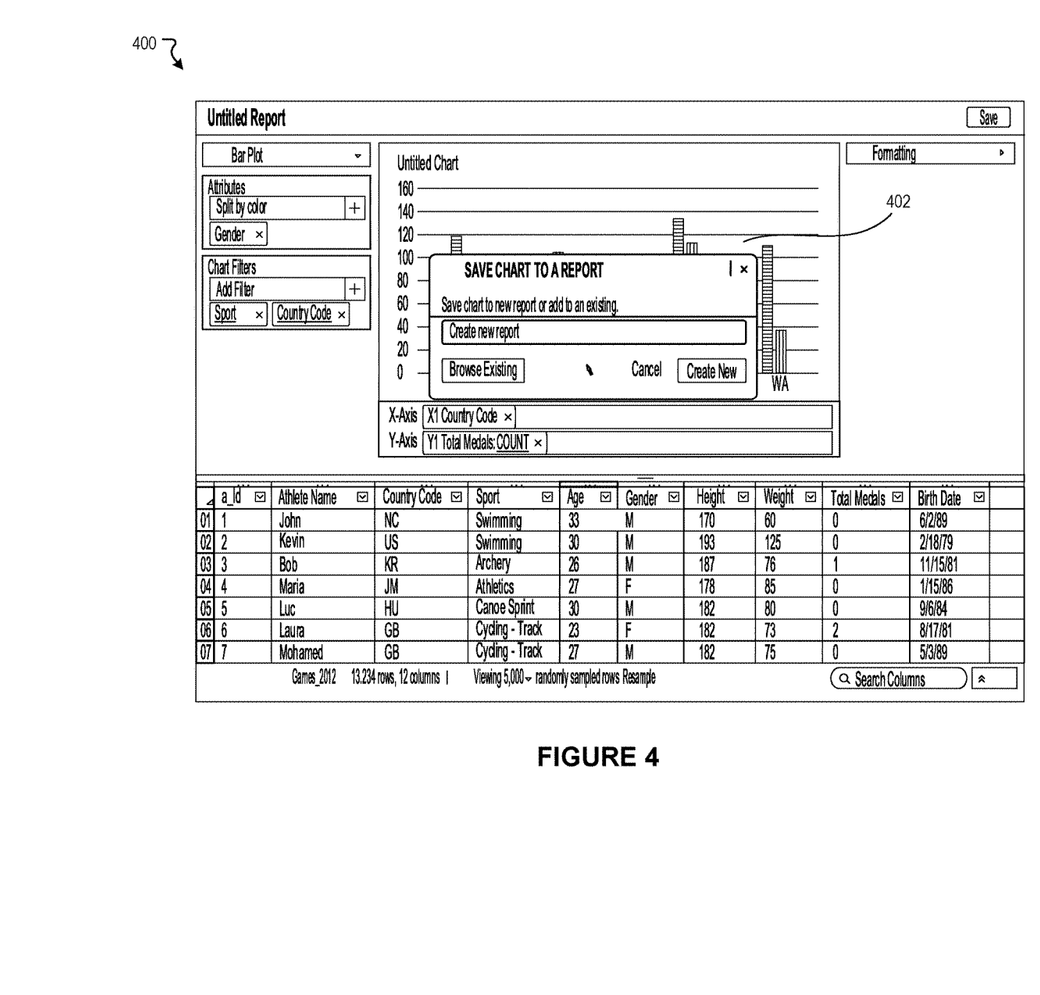
FIG. 4 illustrates another example interface for analyzing data, in accordance with various embodiments.

In some embodiments, the generated chart 326 can be stored (or exported) as an artifact. An artifact can be embedded in various documents such as reports (e.g., slide presentations). For example, the user can select the option 334 to embed the chart 326 in a report. Once the option 334 is selected, a dialog box 402 is presented as illustrated in the example of FIG. 4. As shown in the interface 400 of FIG. 4, the user has the option to embed the chart in a new or existing report.

Figure 5:
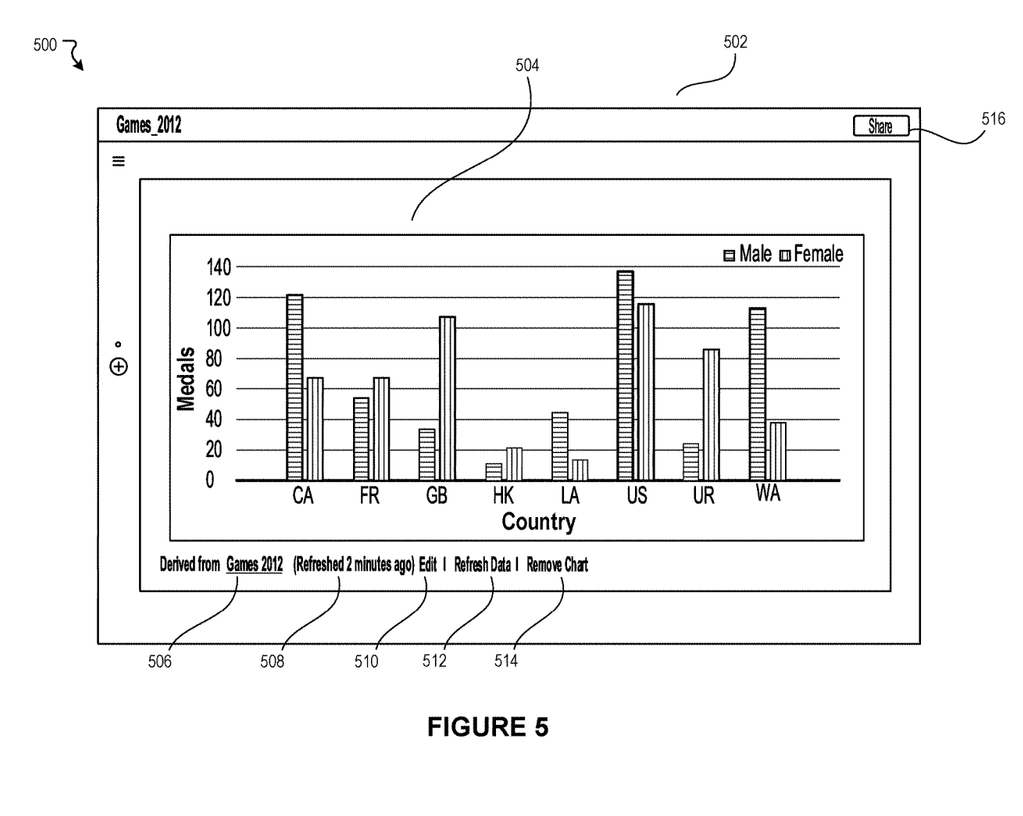
FIG. 5 illustrates an example diagram of an artifact, in accordance with various embodiments.

FIG. 5 illustrates an example diagram 500 of an artifact 502 of a chart 504. In some embodiments, the artifact 502 may be accessible through an application (e.g., web browser, data analysis application, etc.) running on a computing device. In some embodiments, a data analysis platform can be configured to utilize various data processing engines to enable the functionality described in reference to the artifact 502. The computing device through which the artifact 502 is being accessed can interact with the data analysis platform to enable such functionality.

As shown in FIG. 5, the artifact 502 captures a representation of the chart 504 (e.g., the chart 326 as described in reference to FIG. 3). As mentioned, the artifact 502 may be embedded in a report. In addition to providing a visualization of the chart 504, the artifact 502 can also indicate the data set 506 from which the chart 504 was generated (e.g., "Games 2012") and also an indication 508 of when the chart 504 was last updated. In some embodiments, a set of options for interacting with the artifact 502 can be provided. For example, the option 510 may be selected to edit the chart. In this example, the user selecting the option 510 can be provided a new interface through which the chart 504 can be updated (e.g., the interface 300 of FIG. 3). In some embodiments, the user can select the option 512 to refresh (or update) the chart 504 based on any changes to the underlying data set from which the chart 504 was generated.

In some embodiments, generated charts are stored as nodes in an object model that is managed by the data analysis platform. For example, the chart 504 (or artifact 502) can be stored as a node in the object model. In some embodiments, any changes (e.g., transformations) made to the chart 504 will result in the creation of a new node that describes the updated chart 504. As a result, each node corresponding to the chart 504 can describe the state of the chart 504 at some point in time. As a result, different versions of the same chart can be available to different users depending on which node is being accessed. Thus, in some embodiments, the chart 504 can be associated with a particular node in the object model. In such embodiments, if the chart 504 is updated, the artifact 502 will still reference the node that describes the chart 504 prior to the update. As a result, the report in which the artifact 502 is embedded will not be altered until, for example, the option 512 is selected. In some embodiments, an option 514 can be selected to remove the chart 504 from the artifact 502 in its entirety. In some embodiments, the artifact 502 and/or the chart 504 can be shared with other users by selecting an option 516. This sharing may involve sending data describing the artifact 502 and/or the chart 504 over various communication mediums (e.g., email, message, etc.).

Figure 6:
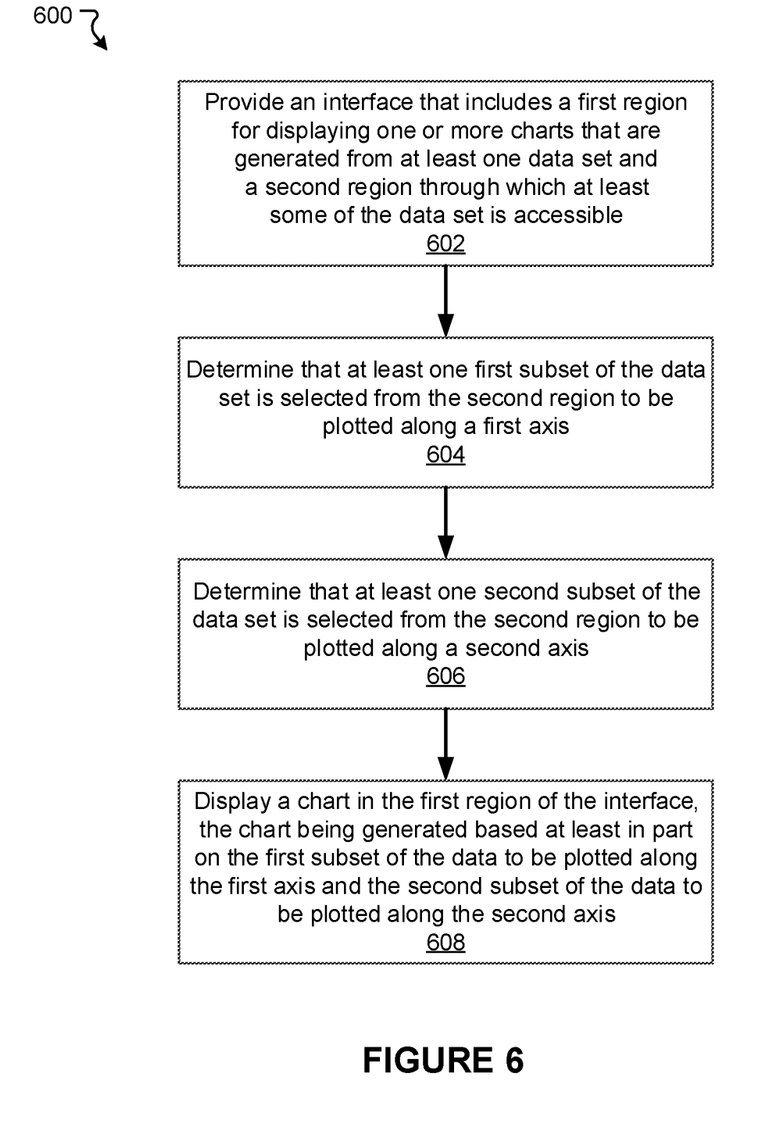
FIG. 6 illustrates a flowchart of an example method, in accordance with various embodiments.

FIG. 6 illustrates a flowchart of an example method 600, according to various embodiments of the present disclosure. The operations of method 600 presented below are intended to be illustrative. Depending on the implementation, the example method 600 may include additional, fewer, or alternative steps performed in various orders or in parallel. The example method 600 may be implemented in various computing systems or devices including one or more processors.

At block 602, an interface is provided. The interface includes a first region for displaying one or more charts that are generated from at least one data set and a second region through which at least some of the data set is accessible. At block 604, a determination is made that at least one first subset of the data set is selected from the second region to be plotted along a first axis. At block 606, a determination is made that at least one second subset of the data set is selected from the second region to be plotted along a second axis. At block 608, a chart is displayed in the first region of the interface, the chart being generated based at least in part on the first subset of the data to be plotted along the first axis and the second subset of the data to be plotted along the second axis.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
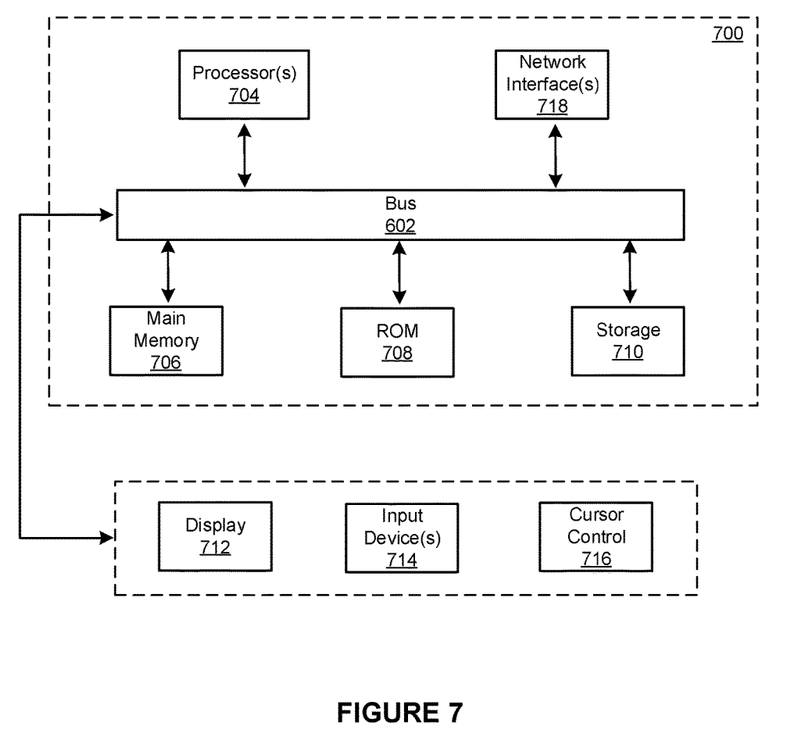
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method being implemented by a computing system including one or more physical processors and storage media storing machine-readable instructions, the method comprising:
   providing an interface that includes a first region for displaying one or more charts that are generated from at least one data set and a second region through which at least some of the data set is accessible;
   determining that at least one first subset of the data set is selected from the second region to be plotted along a first axis based on determining that a user operating the system has performed a first operation to drag-and-drop a representation of the first subset from the second region into the first region;
   displaying a chart in the first region of the interface, the chart being generated based at least in part on the first subset of the data to be plotted along the first axis, the chart having one axis:
   determining that at least one second subset of the data set is selected from the second region to be plotted along a second axis based on determining that the user operating the system has performed a second operation to drag-and-drop a representation of the second subset from the second region into the first region; and
   displaying an updated chart in the first region of the interface, the updated chart having two axes, the updated chart being generated based at least in part on the first subset of the data to be plotted along the first axis and the second subset of the data to be plotted along the second axis, the chart being updated to display the updated chart in response to the determining that the at least one second subset of the data set is selected from the second region to be plotted along the second axis.

2. The method of claim 1, wherein the first region includes a first field that corresponds to the first axis, and wherein the first region includes a second field that corresponds to the second axis.

3. The method of claim 1, wherein determining that at least one first subset of the data set is selected from the second region to be plotted along the first axis further comprises:
   determining that the user operating the system has inputted a name of a column included in the data set into a field in the first region that corresponds to the first axis.

4. The method of claim 1, wherein determining that at least one first subset of the data set is selected from the second region to be plotted along the first axis further comprises:
   determining that the user operating the system has performed an operation to apply at least one aggregate transformation to the first subset of the data, the chart in the first region being generated based at least in part on the applied aggregate transformation to the first subset of the data.

5. The method of claim 1, wherein the data set is presented in the second region of the interface in a tabular format, wherein the first subset corresponds to a first column, and wherein the second subset corresponds to a second column.

6. The method of claim 1, the method further comprising:
   determining that at least one third subset of the data set is selected from the second region to be plotted along the second axis; and
   displaying the updated chart in the first region of the interface, the updated chart being generated based at least in part on the first subset of the data to be plotted along the first axis, the second subset of the data to be plotted along the second axis, and the third subset of the data to be plotted along the second axis.

7. The method of claim 1, the method further comprising: exporting the updated chart as an artifact, the artifact being embedded in at least one report.

8. The method of claim 7, wherein the embedded artifact is capable of being automatically updated in the report to reflect changes made to the data set.

9. The method of claim 7, wherein the embedded artifact is capable of being shared with other users over one or more communication mediums.

10. A system comprising:
one or more processors; and
memory storing instructions that, when executed by the one or more processors, cause the system to perform:
providing an interface that includes a first region for displaying one or more charts that are generated from at least one data set and a second region through which at least some of the data set is accessible;
determining that at least one first subset of the data set is selected from the second region to be plotted along a first axis based on determining that a user operating the system has performed a first operation to drag-and-drop a representation of the first subset from the second region into the first region;
displaying a chart in the first region of the interface, the chart being generated based at least in part on the first subset of the data to be plotted along the first axis, the chart having one axis;
determining that at least one second subset of the data set is selected from the second region to be plotted along a second axis based on determining that the user operating the system has performed a second operation to drag-and-drop a representation of the second subset from the second region into the first region; and
displaying an updated chart in the first region of the interface, the updated chart having two axes, the updated chart being generated based at least in part on the first subset of the data to be plotted along the first axis and the second subset of the data to be plotted along the second axis, the chart being updated to display the updated chart in response to the determining that the at least one second subset of the data set is selected from the second region to be plotted along the second axis.

11. The system of claim 10, wherein the first region includes a first field that corresponds to the first axis, and wherein the first region includes a second field that corresponds to the second axis.

12. The system of claim 10, wherein determining that at least one first subset of the data set is selected from the second region to be plotted along the first axis further cause the system to perform:
determining that the user operating the system has inputted a name of a column included in the data set into a field in the first region that corresponds to the first axis.

13. The system of claim 10, wherein determining that at least one first subset of the data set is selected from the second region to be plotted along the first axis further cause the system to perform:

determining that the user operating the system has performed an operation to apply at least one aggregate transformation to the first subset of the data, the chart in the first region being generated based at least in part on the applied aggregate transformation to the first subset of the data.

14. A non-transitory computer readable medium comprising instructions that, when executed, cause one or more processors to perform:
providing an interface that includes a first region for displaying one or more charts that are generated from at least one data set and a second region through which at least some of the data set is accessible;
determining that at least one first subset of the data set is selected from the second region to be plotted along a first axis based on determining that a user operating the system has performed a first operation to drag-and-drop a representation of the first subset from the second region into the first region;
displaying a chart in the first region of the interface, the chart being generated based at least in part on the first subset of the data to be plotted along the first axis, the chart having one axis:
determining that at least one second subset of the data set is selected from the second region to be plotted along a second axis based on determining that the user operating the system has performed a second operation to drag-and-drop a representation of the second subset from the second region into the first region; and
displaying an updated chart in the first region of the interface, the updated chart having two axes, the updated chart being generated based at least in part on the first subset of the data to be plotted along the first axis and the second subset of the data to be plotted along the second axis, the chart being updated to display the updated chart in response to the determining that the at least one second subset of the data set is selected from the second region to be plotted along the second axis.

15. The non-transitory computer readable medium of claim 14, wherein the first region includes a first field that corresponds to the first axis, and wherein the first region includes a second field that corresponds to the second axis.

16. The non-transitory computer readable medium of claim 14, wherein determining that at least one first subset of the data set is selected from the second region to be plotted along the first axis further cause the processors to perform:
determining that the user operating the system has inputted a name of a column included in the data set into a field in the first region that corresponds to the first axis.

17. The non-transitory computer readable medium of claim 14, wherein determining that at least one first subset of the data set is selected from the second region to be plotted along the first axis further cause the processors to perform:
determining that the user operating the system has performed an operation to apply at least one aggregate transformation to the first subset of the data, the chart in the first region being generated based at least in part on the applied aggregate transformation to the first subset of the data.

* * * * *